United States Patent [19]
Yokoyama et al.

[11] Patent Number: 6,038,335
[45] Date of Patent: *Mar. 14, 2000

[54] FLAW DETECTION APPARATUS USING DIGITAL IMAGE DATA INDICATIVE OF A SURFACE OF AN OBJECT

[75] Inventors: Haruhiko Yokoyama; Akira Kobayashi, both of Osaka, Japan

[73] Assignee: Matsushita Electric Industrial Co. Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/901,058

[22] Filed: Jul. 25, 1997

Related U.S. Application Data

[63] Continuation of application No. 08/462,809, Jun. 5, 1995, abandoned.

[51] Int. Cl.[7] ........................................ G06K 9/00
[52] U.S. Cl. .................. 382/141; 348/92; 364/468.17
[58] Field of Search ................... 382/108, 141, 382/149, 152, 197, 225, 288, 206, 266; 348/92; 73/105; 364/468.17

[56] References Cited

U.S. PATENT DOCUMENTS

| | | | |
|---|---|---|---|
| 4,030,830 | 6/1977 | Holly | 356/359 |
| 4,448,680 | 5/1984 | Wilks et al. | 209/564 |
| 4,484,081 | 11/1984 | Cornyn, Jr. et al. | 250/563 |
| 4,496,056 | 1/1985 | Schoenig, Jr. et al. | 209/539 |
| 4,843,884 | 7/1989 | House et al. | 73/622 |
| 4,920,385 | 4/1990 | Clarke et al. | 356/237 |
| 4,989,973 | 2/1991 | Noso et al. | 356/239 |
| 5,010,578 | 4/1991 | Siener et al. | 382/108 |
| 5,074,673 | 12/1991 | Sowell et al. | 382/225 |
| 5,091,976 | 2/1992 | Murayama | 382/242 |
| 5,155,558 | 10/1992 | Tannenbaum et al. | 382/108 |
| 5,179,419 | 1/1993 | Palmquist et al. | 356/73.1 |
| 5,307,152 | 4/1994 | Boehnlein et al. | 356/376 |
| 5,309,486 | 5/1994 | Lichauer et al. | 376/248 |
| 5,378,994 | 1/1995 | Novak et al. | 382/108 |
| 5,379,350 | 1/1995 | Shimazu et al. | 382/197 |
| 5,392,359 | 2/1995 | Futamura et al. | 382/141 |
| 5,398,291 | 3/1995 | Kitakado et al. | 382/145 |
| 5,436,980 | 1/1995 | Weeks et al. | 382/141 |
| 5,446,549 | 8/1995 | Mazumder et al. | 382/141 |
| 5,448,692 | 9/1995 | Ohta | 395/147 |
| 5,485,532 | 1/1996 | Ishihara | 382/141 |
| 5,710,378 | 1/1998 | Dykes et al. | 73/601 |
| 5,761,337 | 6/1998 | Nishimura et al. | 382/150 |
| 5,777,469 | 7/1998 | Hockey et al. | 324/240 |
| 5,835,220 | 11/1998 | Kazma et al. | 356/369 |

FOREIGN PATENT DOCUMENTS

| | | | |
|---|---|---|---|
| 7026310 | 4/1979 | Australia | 382/108 |

*Primary Examiner*—Jon Chang
*Assistant Examiner*—Jayanti K. Patel
*Attorney, Agent, or Firm*—Ratner & Prestia

[57] ABSTRACT

A flaw detection apparatus detects a flaw formed on an object's surface based on a digital image data indicative of said object's surface as regions which are groups of plural pixels utilizing the image processing technique. An image processor is provided for detecting an extending direction in which each region extends based on a contour line of each region, so that regions extending in the same direction are clustered as one region. The image processor further produces a flaw signal indicating sizes of thus clustered regions.

7 Claims, 13 Drawing Sheets

FLAW DETECTION APPARATUS USING DIGITAL IMAGE DATA INDICATIVE OF A SURFACE OF AN OBJECT

This application is a continuation of application Ser. No. 08/462,809 filed Jun. 5, 1995, now abandoned.

BACKGROUND OF THE INVENTION

1. Field of the Invention

The present invention relates to a flaw detection apparatus for detecting flaws in mechanical components and other items and, more particularly, to a flaw detection apparatus utilizing the image processing techniques.

2. Description of the Prior Art

For the detection of flaws on an object, various kinds of flaw detection apparatuses utilizing the image processing technique are proposed. In FIG. 7A, a cylinder 1 having flaws on the surface thereof is shown. In FIG. 7B, a binary image of the surface area of the cylinder 1 in FIG. 7A, where plural flaws are available, is shown on an enlarged scale. When there is a flaw on a smooth surface, the area of the flaw will reflect irregularly. As a result, dark-field illumination, whereby light is emitted to the surface at an angle such that direct reflections do not enter the imaging apparatus, can be used in flaw detection by image processing because only reflections from the irregularly reflecting flaw area will enter the imaging apparatus, and an image of the flaw can thus be obtained. Thus, the binary image representing, for example five in this case, areas R1, R2, R3, R4, and R5 each corresponding to flaws separated to each other is obtained in a such manner, as shown in FIG. 7B.

To obtain this binary image, the input from the television camera is stored to an image storing circuit using an image input device. The stored image is then digitized. This means that pixels with a pixel density exceeding a predetermined threshold value are assigned a value of 1, and pixels with a pixel density below this threshold value are assigned a value of 0. As a result, when the image in FIG. 7A is digitized, the pixels in the area of the reflecting flaw are given a value of 1, and all other pixels are given a value of 0.

The next step is labelling. In labelling, the image is divided into areas of pixels each with a density value of 1 and areas of pixels each with a density value of 0. Linked areas are further formed in the density 1 pixel areas from vertically, horizontally, and diagonally adjacent pixels each with a density of 1, these linked areas are sequentially numbered throughout the image, and each pixel in linked areas is assigned the sequential number of the linked area to which it belongs.

After all pixels are labelled, the plural label numbers assigned to pixels in connected areas are unified to a single common label number in order to unify the pixel label numbers in connected label areas.

After this labelling process is completed, the area, or more specifically the number of pixels, of each uniquely numbered linked area (hereafter "label areas") is computed. While there may be reflections (density 1 pixel areas) other than flaws caused by irregular reflections from dust or other foreign matter or slight irregular reflection from smooth areas, these areas will be limited to a very small area. As a result, label areas smaller than a predetermined area threshold are eliminated to prevent false recognition of flaws, and the label areas exceeding a predetermined area threshold are extracted as "flaws".

The problem with this conventional method is described below. Specifically, flaws caused by an impact to the smooth surface area of the inspected item typically occur as a series of plural binary images as shown in FIG. 7A. When the flaw is a fine line of multiple imperfections and the label area of each individual imperfection is evaluated, the small area of each individual flaw makes it difficult to determine whether there is actually a flaw or simply dust or other foreign matter on the surface.

SUMMARY OF THE INVENTION

The present invention has been developed with a view to substantially solving the above described disadvantages and has for its essential object to provide an improved flaw detection apparatus.

In order to achieve the aforementioned objective, a flaw detection apparatus for detecting a flaw formed on an object's surface based on a first digital image data indicative of said object's surface as a first group of plural pixels adjacent to each other, said apparatus comprises a first direction detection means for detecting an extending direction in which each said first group extends based on the contour thereof; a first cluster means for combining a plurality of said first groups extending in the same direction; and a first flaw signal producing means for producing a first flaw signal indicating sizes of said combined groups.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

Figure 1:
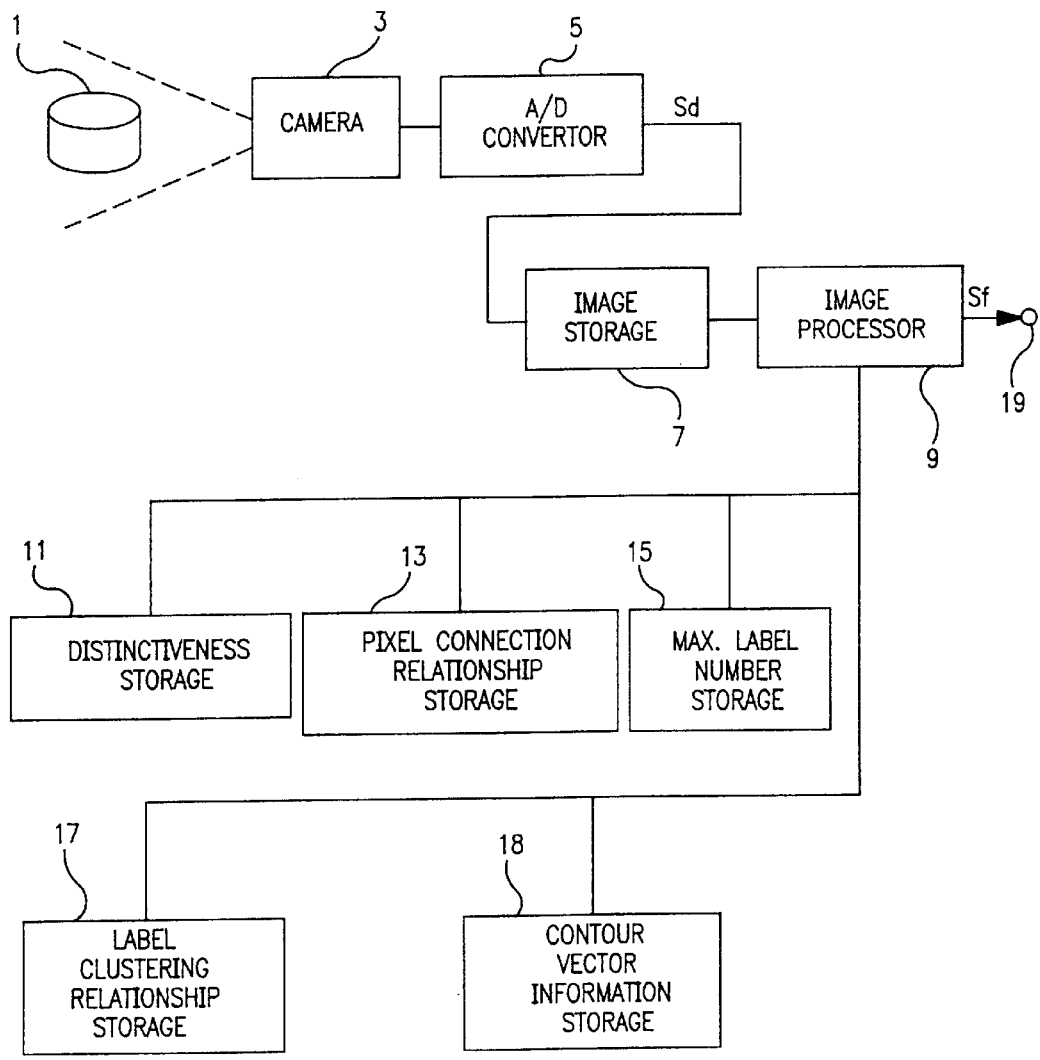
FIG. 1 is a block diagram showing a flaw detection apparatus according to the present invention.

Referring to FIG. 1, a block diagram of a flaw detection apparatus according to a preferred embodiment of the present invention is shown. The flaw detection apparatus includes a camera 3, an A/D converter 5, an image storage 7, and an image processor 9. The camera 3 is provided for taking an image of an inspecting object 1 to produce an analog image signal based on thus taken image. The A/D converter 5 converts the analog image signal coming from the camera 3 to a digital image signal Sd. The image storage 7 is comprised of a frame memory, and stores the digital image signal Sd indicative of image information of the object 1. The image processor 9 includes a distinctiveness storage 11, a pixel connection relationship storage 13, a maximum label number storage 15, a label clustering relationship storage 17 and a contour vector information storage 18.

The image processor 9 processes the digital image signal Sd from the image storage 7 to produce a flaw coefficient signal Sf representing the degree of flaw. During the production of the flaw coefficient signal Sf, various signals are produced and stored in each of storage 11, 13, 15, 17, and 18 which will be described later with reference to FIGS. 3, 4, 5, and 6. The flaw coefficient signal Sf is transferred to the externals through an output 19.

Figure 2:
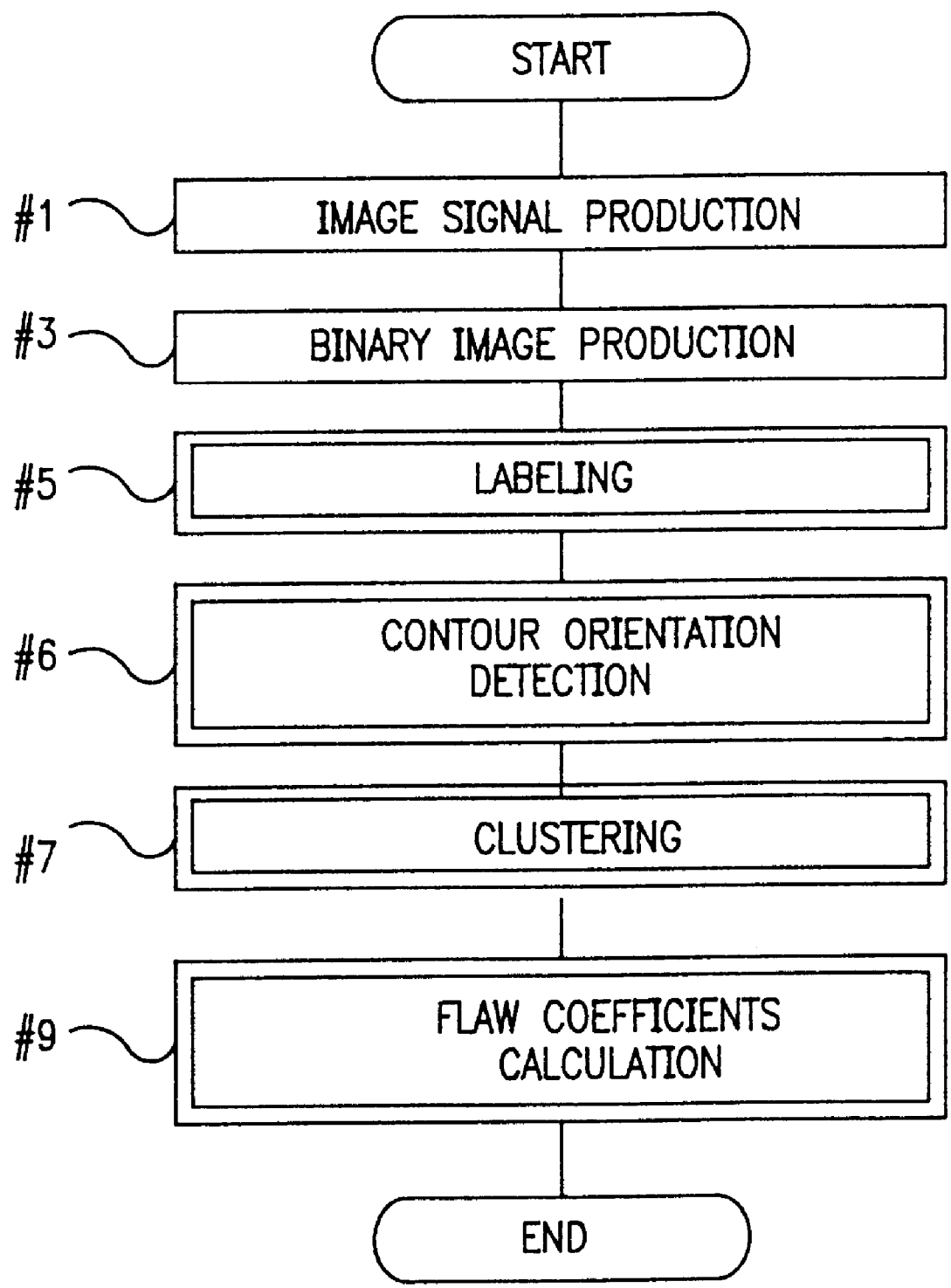
FIG. 2 is a flow chart showing an operation of the flaw detection apparatus of FIG. 1, FIGS. 3A and 3B, taken together as shown in FIG. 3, show a flow chart for the labeling block in FIG. 2.

Referring to FIGS. 2, 3, 4, 5, and 6, the flaw charts for describing the operation of the flaw detection apparatus of FIG. 1 are shown. In FIG. 2, the blocks marked by a double outline represent sub-routine blocks.

Figure 7A:
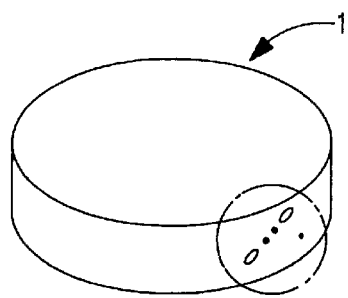
FIG. 7A is a perspective view showing a cylinder used as the inspection target by way of example.

In the first block #1 of FIG. 2, "IMAGE SIGNAL PRODUCTION", the video camera 3 takes the image of the object 1, which may be a cylinder as shown in FIG. 7A for example, and then produces the analog image signal based on the image thus taken.

Figure 7B:
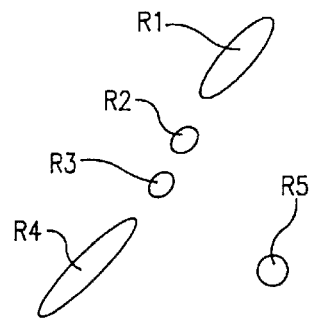
FIG. 7B is a graph showing, on an enlarged scale, a portion of FIG. 7A which is enclosed by the circle.

In the next sub-routine block #3, "BINARY IMAGE PRODUCTION", the A/D converter 5 converts the analog image signals indicative of the inspected object's surface to the digital image signals Sd. This means that pixels with a pixel density exceeding a predetermined threshold value are assigned a value of 1, and pixels with a pixel density below this threshold value are assigned a value of 0. As a result, when the image signal is digitized, the pixels in the area of the reflecting flaw are given a value of 1, and all other pixels are given a value of 0. This digitized image signal is then stored in the image storage 7. As a result, a binary image of the inspected area of the cylinder 1 including flaws is obtained, as shown in FIG. 7B.

In the next sub-routine block #5, "LABELLING", the image storage 7 stores the digital image signal Sd therein. The image processor 9 assigns label numbers to pixels with a value of 1 so that each uniquely linked area has a common label number. The labeling operation will be further described later with reference to FIGS. 3 and 8.

In the next sub block #6, "CONTOUR ORIENTATION DETECTION", the oriented directions of the labeled image regions are detected based on the contour vectors thereof. This operation will be further described later with reference to FIG. 4.

In the next sub block #7, "CLUSTERING", labelled areas oriented in the same direction on substantially the same line are assumed to have been caused by a common factor, e.g., a single impact, and are therefore evaluated as a single cluster the image processor 9. The direction in which each labelled area is oriented is determined by utilizing the contour direction codes of thereof. The clustering operation will be specifically described later with reference to FIGS. 5, 9A, 9B, 9C, 9D, 9E, and 9F.

In the next sub block #9, "FLAW COEFFICIENTS CALCULATION", the image processor 9 calculates the flaw coefficients representing the magnitude of detected flaw based on the clustered labelled areas, and transfers the flaw coefficient signal Sf through the output 11 for further operation. The operation will be specifically described later with reference to FIG. 6.

Figure 3A:
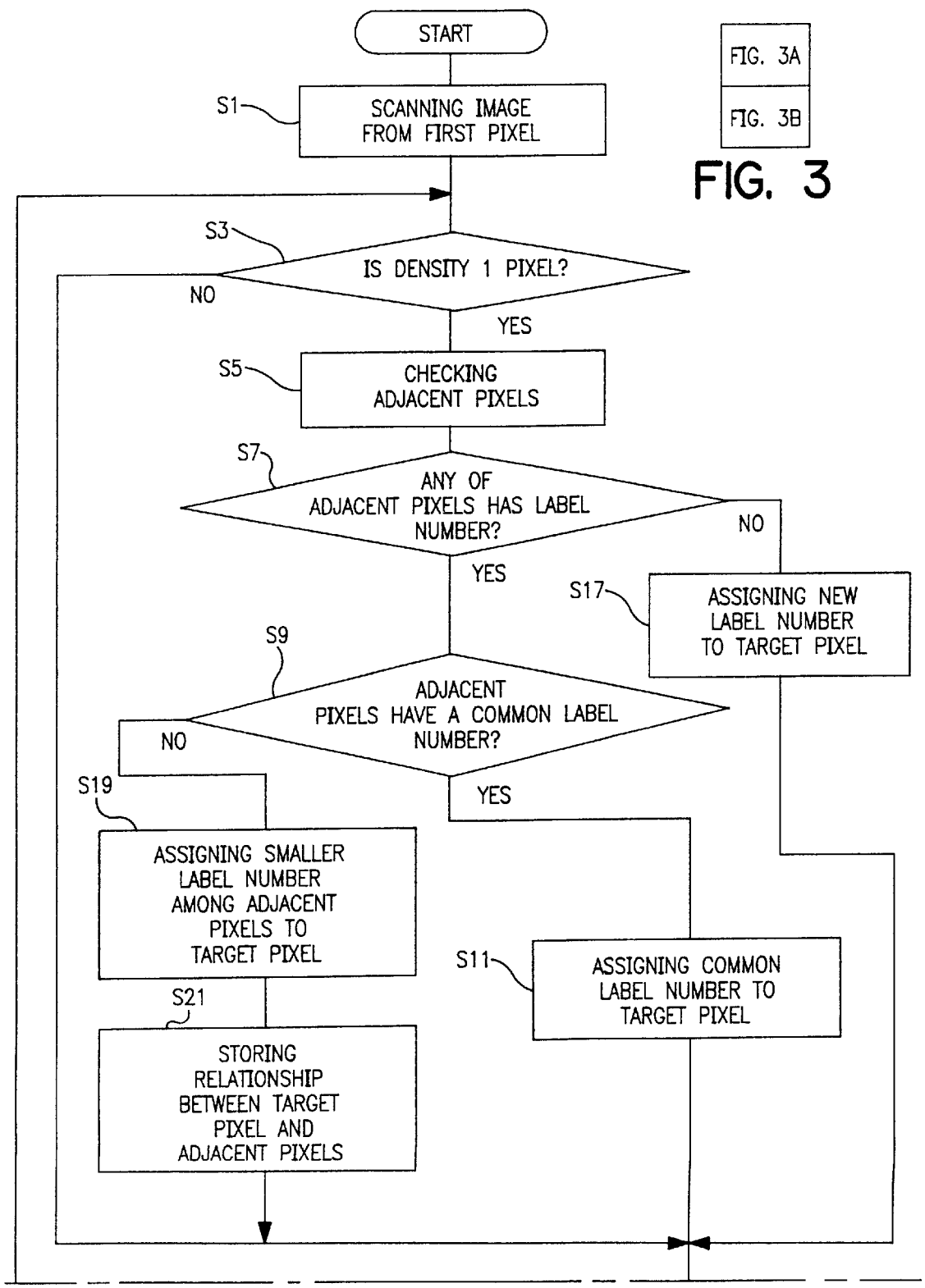
Figure 3B:
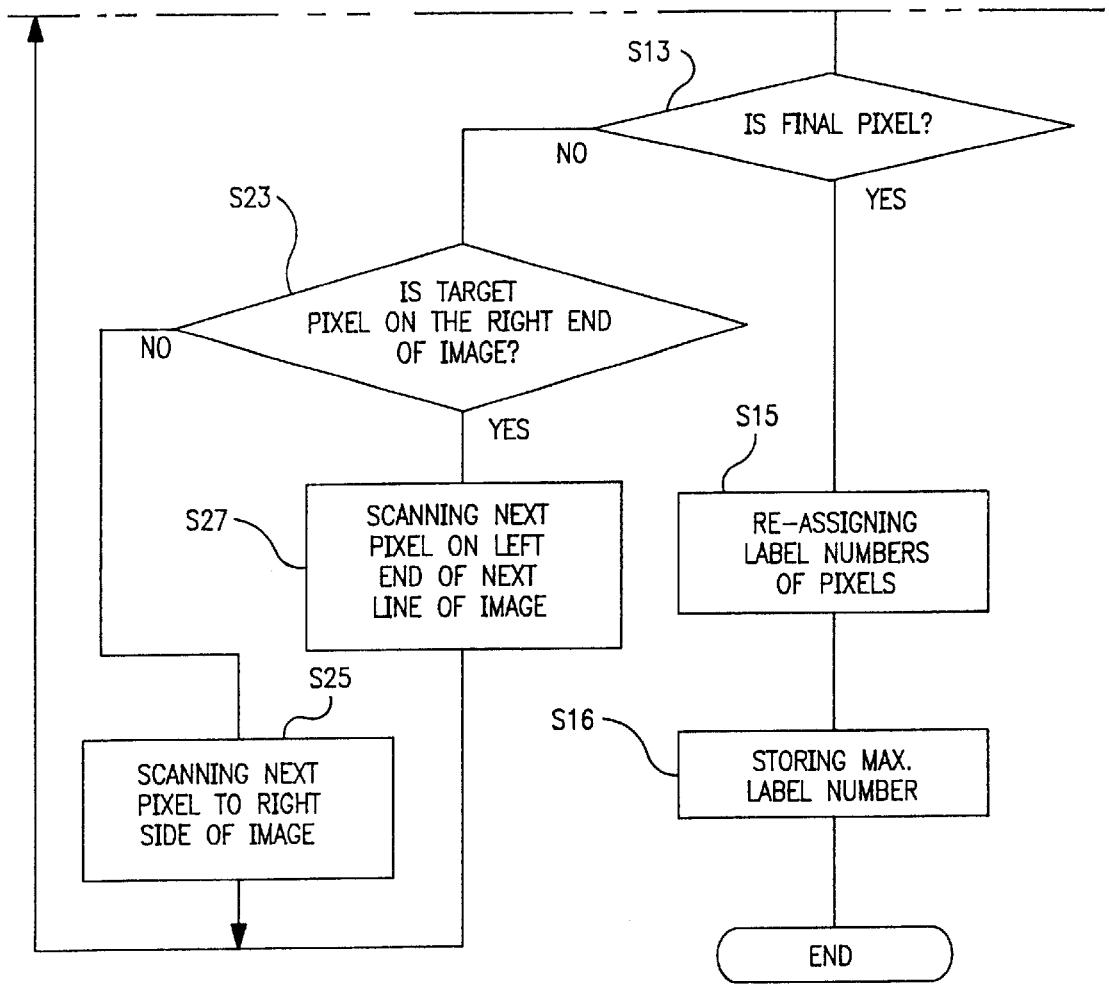
Figure 8:
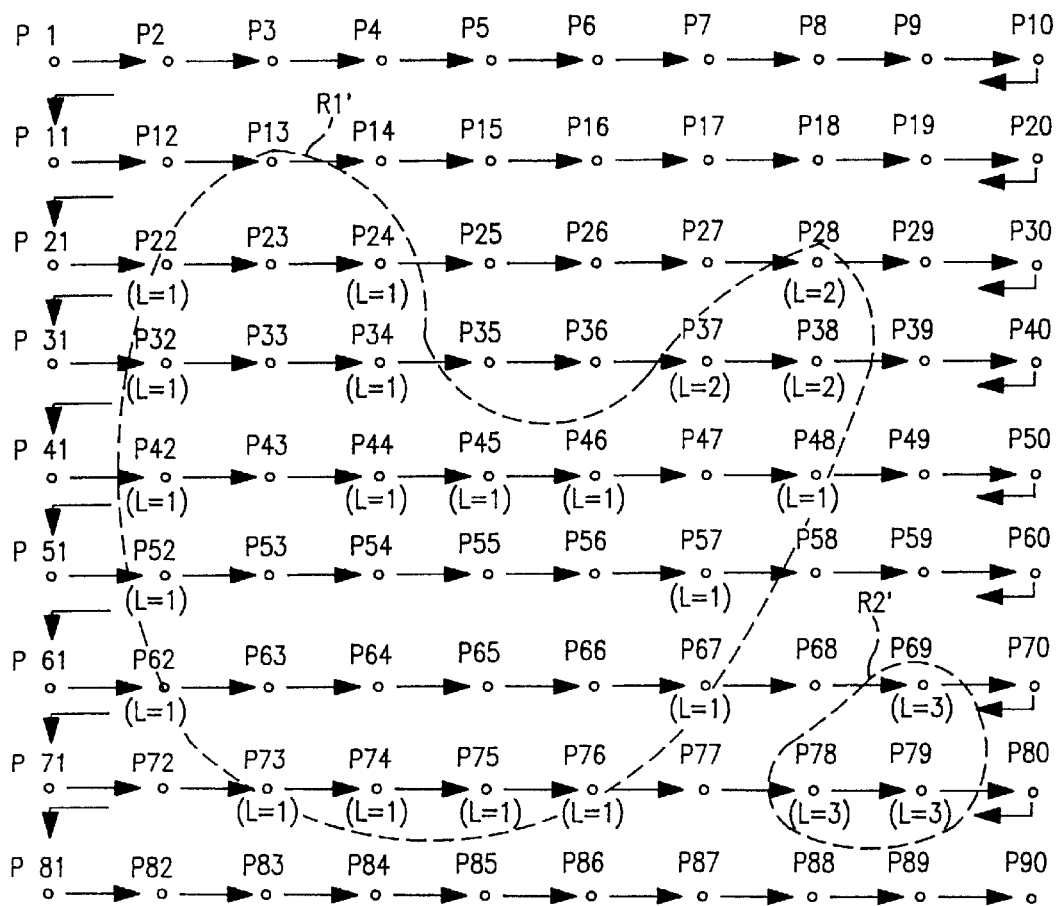
FIG. 8 is an illustration of assistance in explaining the labelling operation according to the present invention.

Before specifically describing the labeling operation in this embodiment with reference to FIGS. 3 and 8, the concept of labeling operation according to the present invention is briefly described for the sake of better understanding. In labelling, the image may be divided into areas of pixels each with a density value of 0. These pixels are raster scanned from top to bottom, left to right. Specifically speaking, each of pixels located in the top line is sequentially scanned from the first one (the left side) to the last one (the right side). Then, pixels in the next line below the top line are scanned in a manner similar to that in the top line.

Every time when a pixel with a density value of 1 (hereafter referred to as "a density 1 pixel") is scanned, this pixel is set as the target pixel and is assigned a label number L. The label number is an integer. Basically, a different label number L increased in order is successively assigned to each target pixel.

The label number L=1 is assigned to the first target pixel and the raster scanning continues. When the next, or second, target pixel is set, adjacent eight pixels surrounding the target pixel, four pixels located the left, above left diagonally, above, and the above right diagonally with respect to the target pixel are checked whether a label number L is assigned thereto. It is to be noted that these four adjacent pixels are already scanned before the target pixel is scanned. When these four adjacent pixels have a common label number L, including the case that only one of adjacent pixels has the label number L, that label number L is assigned to the target pixel.

When two or more label numbers L=n, m, . . . (n, m . . . are integers) are assigned to these adjacent pixels, one of the label numbers which is smaller than the others is assigned and information indicating that label numbers L=n, L=m . . . are connected is stored for the later operation wherein the label numbers are organized and unified. When four adjacent pixels have no label number, the next label number with respect to that of the previous target pixel is assigned.

The raster scanning is thus applied to all pixels in the binary image stored in the image storage 7. Linked areas are further formed in the density 1 pixel areas from vertically, horizontally, and diagonally adjacent to each other, these linked areas are sequentially numbered throughout the image. As a result, each pixel in each linked area is assigned the same sequential number which is given to the region to which it belongs.

Referring to FIG. 8, the binary image stored in the image storage 7 is shown. In FIG. 8, the image is expressed by pixels P1 to P90, for example, arranged in a rectangular matrix. The areas corresponding two flaw regions R1' and R2' on the inspected surface of cylinder 1 are shown by dot lines. Each of small circles indicates a pixel. The small circles indicating the density 1 pixels are painted in block.

The raster scanning is starting from the first pixel P1. Since the pixels P1 to P12 are not the density 1 pixels, these pixels are not the target pixels and no label number L is assigned thereto. However, the next pixel P13 is the first density 1 pixel. Therefore the pixel P13 is set as the first target pixel and is assigned the label number 1 (L=1), as shown in FIG. 8.

Then, the raster scanning is applied to the next pixel P14. The pixels P14 to P21 are not the density 1 pixels in this example, and no label number L is assigned thereto. Hereinafter the description of the operation for non density 1 pixels are omitted for the sake of brevity, because non density 1 pixels are only scanned as a result.

The next pixel P22 which is the density 1 pixel is set as the target pixel. Then, the label number of four pixels P21, P11, P12, and P13 adjacent the target pixel P22 are checked. In this example of FIG. 8, since only the pixel P13 has the label number L=1, 1 is assigned to the target pixel P22 (L=1).

With respect to pixels P23 and P24, the common label number L=1 of the adjacent pixels is assigned.

After raster scanning of pixels P25 to P27, the next density 1 pixel P28 is set as the target pixel. Since the pixels P27, P17, P18, and P19 adjacent the pixel P23 has no label number, a new label number of 2 (L=2) which is different from that of pixels P13, P22, P23, and P24 is assigned to the pixel P23.

After scanning of pixels P29, P30, and P31, the pixel P32, P33, and P34 are set as the target and assigned the common label number of 1 (L=1) of the adjacent pixels.

After scanning of pixels P35 and P36, the next density 1 pixel P37 is set as the target pixel. Since the pixel P28 which is one of pixels adjacent to the target pixel P37 having the label number L=2, 2 is assigned to the pixel P37 (L=2). Similarly, the pixel P38 is assigned the common label number of 2 (L=2) of the adjacent pixels thereof.

After scanning of pixels P39, P40, and P41, the pixels P42, P43, P44, and P45 are assigned the label number of 1 (L=1), because 1 is the common label number of the adjacent pixels thereof. However, with respect to the pixel P46, the adjacent pixels P37 and pixel P45 have different label numbers of 2 and 1, respectively. In this case, the label number of 1 smaller than the other is selected for the pixel P46 (L=1), as described in the above. Similarly, the pixels P46, P47, and P48 are assigned the label number L=1.

After assigning the label number of 1 to the pixels P52 to P57, P62 to P67, the next target pixel P69 is set. Since the adjacent pixels P68, P58, P59, and 60 of the target pixel P69 has no label number, a new label number 3 is assigned to the pixel P69 (L=3).

In a manner as described above, the label numbers of 1 is further assigned to pixels P73 to P76, and 3 is assigned to pixels P78 and P79. The pixels having the label numbers of 1 and 2 (L=1 and L=2) are linked as a region corresponding to the flaw R1', while the information that pixels having different label numbers 1 and 2 are connected to one linked region is stored. The pixels having the label number L=3 are linked as another region corresponding to flaw R2'.

After all pixels have been labelled as above, the different label numbers of 1 and 2 assigned to pixels within the connected regions R1' are renumbered to unify to a single common label number. As a result of such renumbering, the regions R1' and R'2 are united to the label numbers L=1 and L=3, respectively. As a result, a gap in the number sequence between the region R1' (L=1) and region R2' (L=3) is generated. If required, the label numbers can be renumbered so that there are no gaps in the number sequence between the regions, such that regions RI' and F2' are newly assigned the label numbers 1 and 2, respectively.

Referring to FIG. 3, the operation of sub routine block #5, "LABELLING", in FIG. 2 is shown.

At step S1, the first pixel on the image matrix is raster scanned, and then the procedure advances to step S3 where it is judged whether the scanned pixel is a density 1 pixel or not.

At step S3, if it is judged as "YES", this density 1 pixel is set as a target pixel. If it is judged as "NO", the procedure advances to step S13.

At step S5, of eight pixels adjacent to the target pixels, the four pixels which are located to the left, above left diagonally, above, and above right diagonally to the target pixel are selected. Any pixel with a density value of 0 is disregarded, and then the procedure advances to step S7.

At step S7, it is judged whether any of thus selected four adjacent pixels is already assigned with a label number L or not. If it is judged as "NO" meaning that none of adjacent pixels have label number, the procedure advanced to step S17 where a label number which is one of a sequence number starting from "one" and is not used yet is assigned to the target pixel. The procedure advances to step S13.

If it is judged as "YES" at step S7 meaning that any of adjacent pixels has the label number L, the procedure advances to step S9 where it is judged whether four adjacent pixels have a common label number or not.

At step S9, if it is judged as "NO" meaning that two or more label numbers L=n, L=m, . . . (n, m, . . . are integers) are already assigned to the four adjacent pixels, the smallest value n, for example, of the label numbers of the adjacent pixels is assigned to the target pixel, and then the procedure advances to step S21.

At step S21, the information indicating the label numbers L=n of the target pixel and L=m, for example, of the adjacent pixels are connected is stored in the pixel connection relationship storage 13 for later use when organizing and unifying the connected label numbers. Then, the procedure advances to step S13.

However, if it is judged "YES" at step S9 meaning that all adjacent pixels has a common label number or only one adjacent pixel has a label number, the procedure advances to step S11.

At step S11, this common or sole label number is assigned to the target pixel. Then, the procedure advances to step S13.

At step S13, it is judged whether the target pixel is located at the right bottom corner of the image matrix, meaning that the target pixel P is the final pixel of the image, for example the pixel P90 as shown in FIG. 8, or not. If the target pixel is not the final pixel, it is judged as "NO" and the procedure advances to step S23.

At step S23, it is judged whether the target pixel P is located on the right end of the scanning line of the image or not. If it is judged as "NO" at step S23, the procedure advances to step S25 where the next pixel adjacent horizontally to the target pixel is scanned. And then, the procedure returns to step S3.

If it is judged as "YES" at step S23, the procedure advances to step S27 where the pixel located on the left end of the next scanning line of the image is scanned. And then, the procedure returns to step S3.

However, if the target pixel is the final pixel of the image, it is judged as "YES" at step S13, and then the procedure advances to step S15. It is to be noted that all density 1 pixels in the image are scanned and assigned label number(s) L at either one of steps S11, S17, and step S19, before it is confirmed at this step that the final pixel was already examined.

At step S15, the plural label numbers assigned to pixels in each of connected regions are unified to a single common label number according to the information stored at step S21 so that the pixel label numbers in one connected label region are unified. Then, the procedure advances to step S16.

At step S16, where the maximum value of label number re-assigned to the target pixels is stored in the a maximum label number storage 15.

After this labelling and renumbering process is completed, the region, or the number of pixels more specifically, of each uniquely numbered linked region (hereafter referred to as "label regions") is computed. While there may be reflections (density 1 pixel regions) other than flaws caused by irregular reflections from dust or other foreign matter or slight irregular reflection from smooth regions, these regions will be limited to a very small region. As a result, label regions smaller than a predetermined region threshold are eliminated to prevent false recognition of flaws, and the label regions exceeding a predetermined region threshold are extracted as what may be "flaws".

Figure 11A:
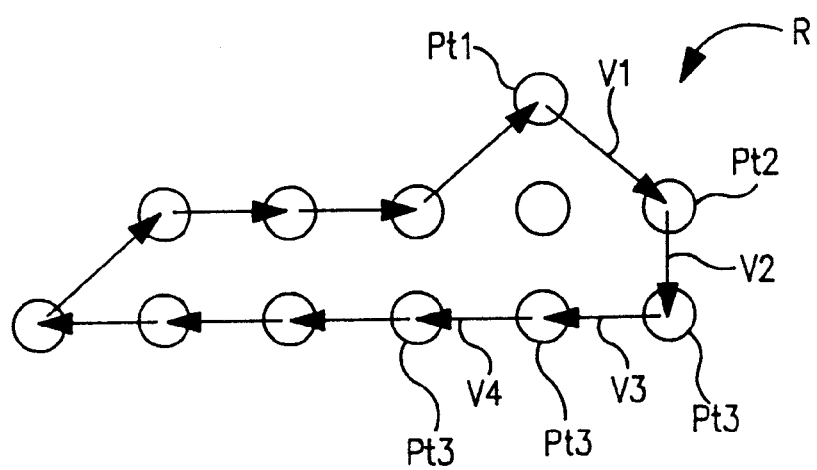
FIG. 11A is an illustration of assistance in explaining the obtaining the contour orientation vector of the labeled regions according to the present invention.

Before explaining the operation of the sub block #6 of FIG. 2, the concept of the contour orientation detection of the labelled regions is described with reference to FIGS. 11A, 11B, and 11C below. In FIG. 11A, a labeled region R, for example, having twelve of density 1 pixels, wherein one pixel is surrounded by the other eleven pixels. In this case, these surrounding pixels determine the contour or outline of the region R, and each line connecting two neighboring surrounding pixels represents a contour vector at that portion.

In operation, the image is first scanned in the normal raster direction, i.e., from left to right, top to bottom, until the first pixel in the labelled area R is found. In this example, the top pixel is designated as a first (current) target pixel Pt1. Eight pixels vertically, horizontally, and diagonally adjacent to the first target pixel Pt1 are checked in clockwise direction starting from the left adjacent pixel (not shown in FIG. 11A, because density 1 pixels only are depicted therein for the sake of brevity) to search a second target pixel Pt2 at which the pixel density changed from 0 to 1. In this example, the adjacent pixel located below right diagonally the first target pixel Pt1 is designated as a second target pixel Pt2.

A vector V starting from the first target pixel Pt1 to the second target pixel Pt2 represents a contour line at that portion, and is referred to as a first contour vector V1. Similarly, the next pixel adjacent vertically below the second target pixel Pt2 is designated as a third target pixel Pt3. At the same time, the second contour vector V2 starting from the second target pixel Pt2 to the third target pixel Pt3 is obtained. This process is repeated to obtain pixels Pt4, Pt5, ... Ptp ("p" is the number of surrounding pixels of the target region, and is eleven in this example) and contour vectors V1, V2, V3, ... Vp until the first target pixel Pt1 is reached again. As a result, the contour of the labelled area R can be connected clockwise around the area by linking the "p (11)" contour vectors V1 to Vp (V11).

Figure 11B:
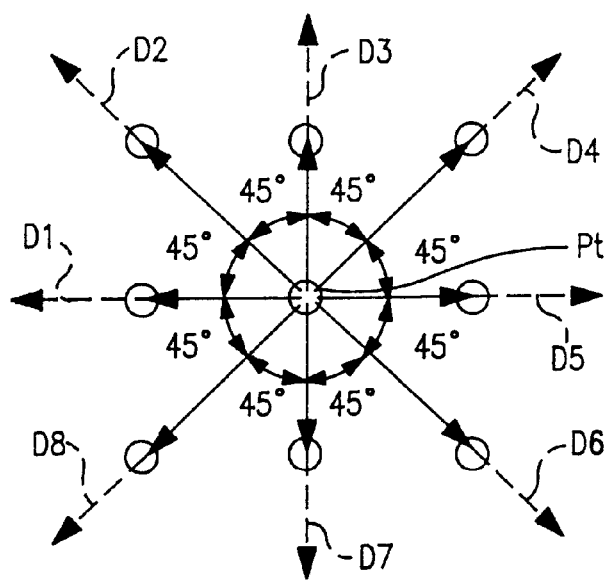
FIG. 11B is a graph showing the directions of contour orientation vectors of FIG. 11A.

As best shown in FIG. 11B, adjacent pixels are checked in the eight directions, horizontally left D1, left above diagonally D2, vertically above D3, right above diagonally D4, horizontally right D5, right below diagonally D6, vertically below D7, and left bellow diagonally D8 for each target pixel Pt. Each direction is spaced by 45°. However, the contour vectors effectively express only four directions, D1, D2, D3, and D4 for example, because the directional pairs that are 180° opposite indicate the same direction. Therefore, each of directions D2, D3, and D4 differs by 45°, 90°, and 135°, respectively.

Figure 11C:
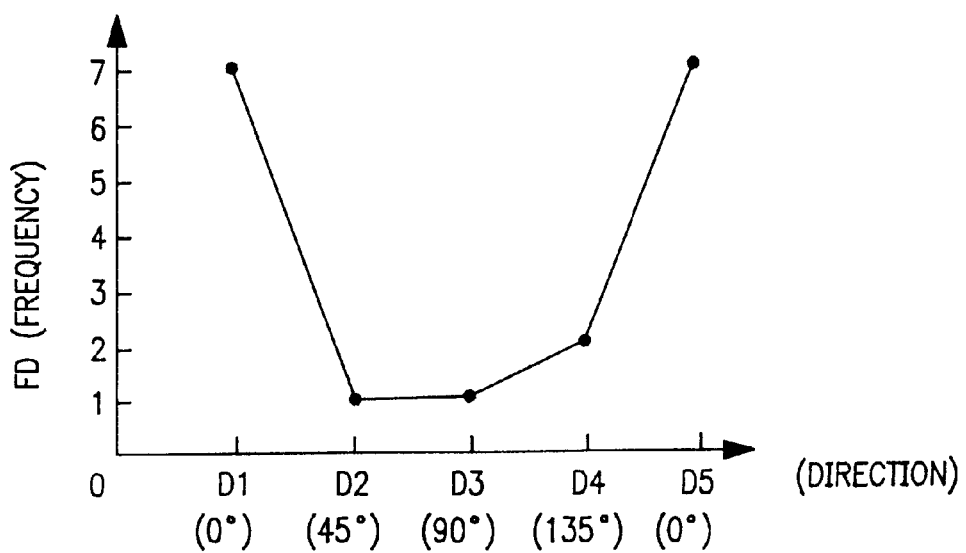
FIG. 11C is a graph showing the distribution of contour orientation vectors of FIG. 11A.

Referring to FIG. 11C, the distribution of oriented directions of the contour vectors V, for example, obtained with respect to the labelled area R of FIG. 11A are shown as a line chart. In this figure, the vertical axis indicates the frequency FD with respect to each oriented direction indicated on the horizontal axis. Therefore, any given labelled area R will be long in the direction for which this frequency is greatest. According to this example, the orientation frequency FD1 corresponding to the first direction D1 shows the greatest number of "seven", and apparently this example region R extends in the first direction D1.

In other words, if the direction in which this frequency is greatest is obtained from the data used to compile this graph (FIG. 11C), this will be the direction in which the long axis of the labelled area R is oriented. Thus, the shape and orientation of the labelled area R can be determined from the distribution of directions shown in FIG. 11C. The operating results of the contour vectors V such a data as the distribution of oriented directions thereof are stored in the contour vector information storage 18.

Using this stored data, a clustering process is executed to combine the data from the labelled areas R determined to be oriented in the same basic direction and thus create the joined data areas.

Figure 4:
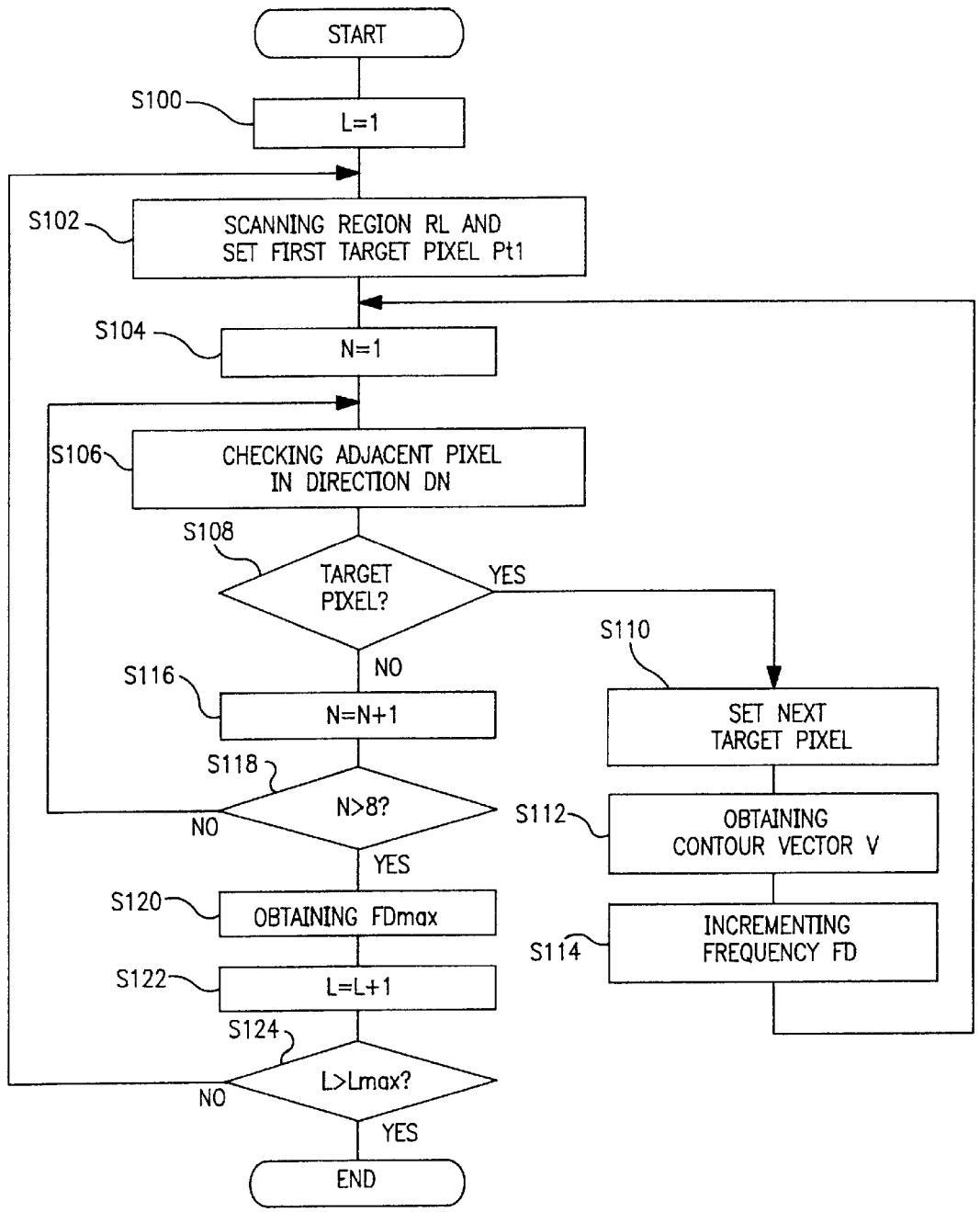
FIG. 4 is a flow chart showing an operation of the contour orientation detection block in FIG. 2.

Referring to FIG. 4, a flow chart of sub routine block #6, "CONTOUR ORIENTATION DETECTION", in FIG. 2 is shown. After the labelling process at the block #5, labelled regions oriented in substantially the same direction or substantially the same line are assumed to have been caused by a common factor, e.g., a single impact, and are therefore evaluated as a single cluster. For this purpose, the direction in which the labelled area R is long is detected in accordance with the counter vectors thereof.

At step S100, one is set to the label number L. Thus, the first labeled area RL (L=1) is set as the target region.

At step S102, the pixels on the first area RL(L=1) are raster scanned, and then the pixel scanned first is set as the first target pixel Pt1. Note that this first scanned pixel is one of those surrounding and contouring the target region RL.

At step S104, the direction identification number N is reset to one.

At step S106, the density of adjacent pixel in the direction DN (D1) is checked.

At step S108, it is judged whether the pixel density changed from 0 to 1 at this adjacent pixel or not. When it is judged "YES", meaning that this adjacent pixel is one of contouring and surrounding pixels, the procedure advances to step S110.

At step S110, this adjacent pixel is set as the current target pixel (Pt2).

At step S112, a contour vector V (V1) connecting the previous and current target pixels (Pt1 and Pt2) is obtained.

At step S114, a frequency counter FD (FDN: FD1) corresponding to the oriented direction (DN) of thus obtained contour vector V (V1) is incremented by one. Then, the procedure returns to step S104 where the direction identification number N is reset, so that the pixels adjacent to the current target pixels (Pt2) will be checked from the first direction D1 by steps S106 and later.

However, at step S108, when it is judged "NO" meaning that this adjacent pixel is not the next target pixel, the procedure advances to step S116.

At step S116, the direction identification number N is incremented by one for checking the next adjacent pixel.

At step S118, it is judged whether "N" is greater than 8, or not. When it is judged "NO", meaning that not all the pixels adjacent to the current target pixel Pt checked yet, the procedure returns to step S106. Thus, the steps S106, S108, S116, and S118 are repeated until when eight adjacent pixels have been checked or when the next target pixel is detected at step S108.

However, when it is judged "YES" at step S118, it is meant that all contouring or surrounding pixels of the current target region R are already checked. Then, the procedure advances to next step S120.

At step S120, the contour vector data such as the most frequent oriented direction FDmax including the distribution each oriented directions of the current target region R are obtained, and are stored in the storage 18.

At step S122, the label number L is incremented by one for checking the next region.

At step S124, it is judged whether thus incremented label number L is greater than the maximum label number Lmax, or not. When it is judged "NO, meaning that there is another labeled region still available, the procedure returns to step S102, so as to check the distribution of contour orientation of the next region.

However when it is judged "YES" at step S124, meaning that there is no labeled region rested for checking the contour orientation, then the procedure terminates. It is to be noted that the contour vector data can be obtained as a weighted mean of each oriented directions of the vector V instead of the most frequent oriented direction FDmax at step S120. In this case, the oriented direction of the region R can be detected in more fine manner.

Figure 5:
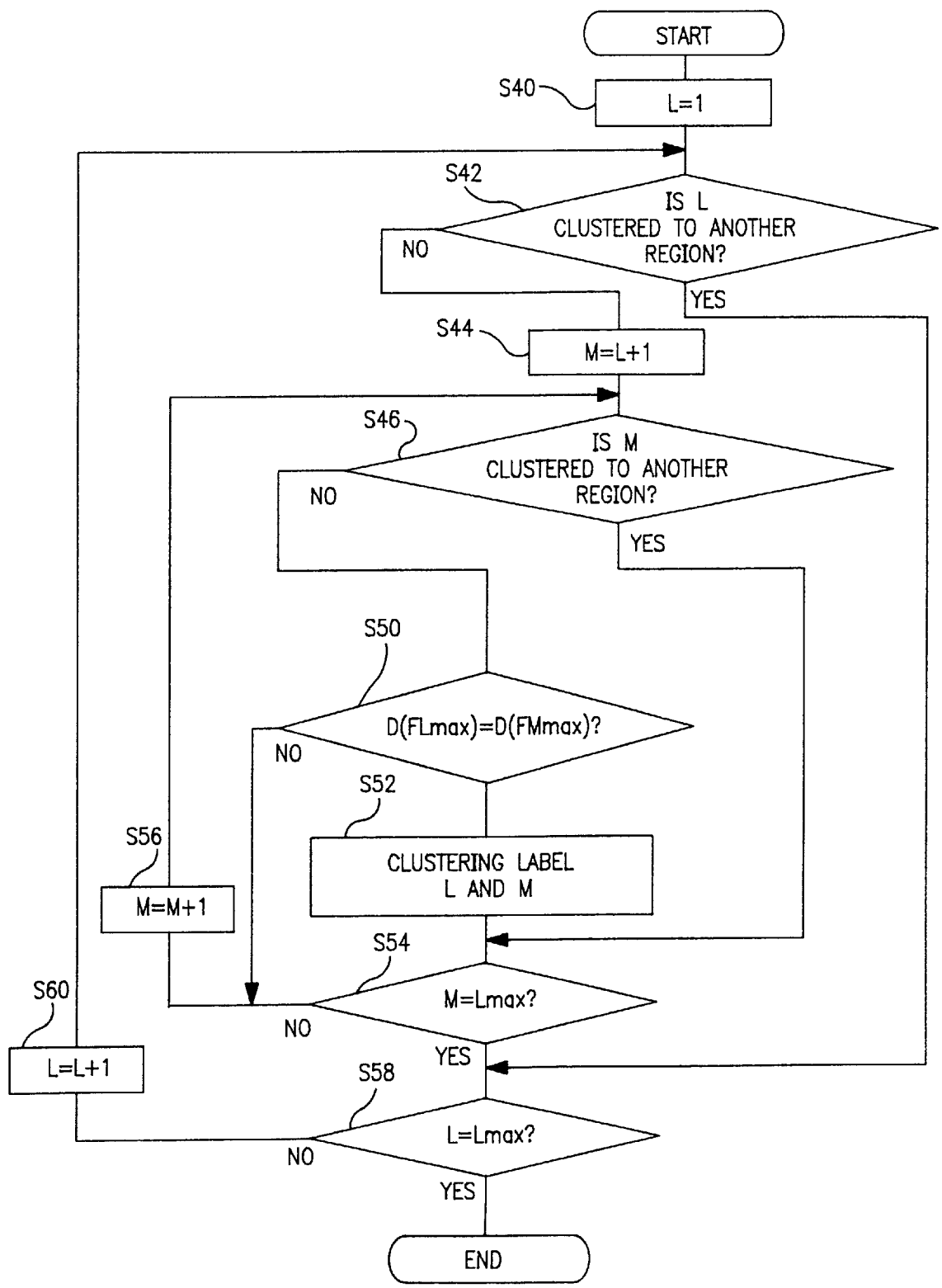
FIG. 5 is a flow chart showing an operation of the clustering block in FIG. 2.

Referring to FIG. 5, the operation of sub routine block #7, "CLUSTERING", in FIG. 2 is shown. After the contour orientation detection at block #6, the labelled regions oriented in substantially the same direction on substantially the same line are clustered based on the data such as a distribution of contour vectors V stored in the contour vector information storage as follows.

At step S40, one is set to the label number L. Thus, the area having the label number (L=1) is set as the target region, and then the procedure advances to step S42.

At step S42, it is judged whether the target region (L=1) is already assigned to other region or not. When this region is not joined (clustered) with other region, it is judged as "NO", and the procedure advances to next step S44. However, when the target region (L=1) is already joined with other, it is judged as "YES". Then the procedure advances to step S58 where the existence of other target region is checked.

At step S44, the current label number L is incremented by 1 as "L+1" and this incremented value is set to the label number M for a next region, and then advances to step S46. Thus, a region having the label number (M=L+1) is selected as a counterpart of the target region L to study the possibility of clustering thereof.

At step S46, it is judged whether the counterpart region M is already joined (clustered) to other region or not, When "NO, the procedure advances to next step S50 for studying the clustering. When the counter part region M is already joined to other region, it is judged as "YES". Then the procedure advances to step S54 where the existence of other counter part region is checked.

At step S50, it is judged whether the directions of D(FLmax) and F(FMmax) is the same or not. It is to be noted that Flmax and Fmmax represent the most frequent contour oriented directions of the regions RL and RM, respectively, and were previously stored in the storage 18 at step S120 of FIG. 4. When, it is judged "YES", meaning that both the regions RL and RM are oriented in the same direction, and then the procedure advances to step S52. However, it is judged "NO", the procedure advances to step S56. As previously described with reference to step S120, the weighted means of the directions instead of the most frequent directions D(FLmax) and F(FMax) may be used for judging the possibility of the clustering two regions.

At step S52, the information meaning that regions L and M can be combined to a single cluster such that the label number of region M shall be renumbered to L is stored in the label clustering relationship storage 17. Then the procedure advances to the next step S54.

At step S54, it is judged whether the label number L is the greatest among the label numbers already assigned or not. When it is "YES" meaning that there is no counterpart region available, the procedure advances to step S58 where the existence of other target region is checked. When it is judged "NO" meaning that there is at least one counterpart region rested in the image, and the procedure advances to step S56.

At step S56, the label number M is incremented by one, and then the procedure returns to step S46. Thus, the region having the label number of M=M+1 is set as the next counterpart region M which will be studied the possibility of clustering to the target region L.

At step S58, it is judged whether the label number L is the greatest among the label numbers already assigned or not. When it is "NO" meaning that there is at least one target region remains in the image, the procedure advances to step S60.

At step S60, the label umber L is incremented by one, and then the procedure returns to step S42. Thus, the region having the label number of L=L+1 is set as the next target region L which will be studied the possibility of clustering to the counterpart region M. However, when it is "YES" at step S58, meaning that there is no target region remains in the image, the procedure terminates.

It is to be that although two regions RL and RM are clustered when the most frequent oriented directions D(FLmax) and F(FMmax) are the same in the above described embodiment, it is also possible to cluster two regions RL and RM whose most frequent oriented directions D(FLmax) and F(FMmax) are separated by less than a predetermined angle, for example, 45° or others. In this sense, adopting the weighted mean of directions is more effective than the most frequent oriented directions D(FDmax). It is also to be noted that the most frequent oriented direction D(FDmax) or the weighted means of directions can be obtained with respect to the newly clustered (clustered) region for judging the possibility to cluster another region.

Figure 9A:
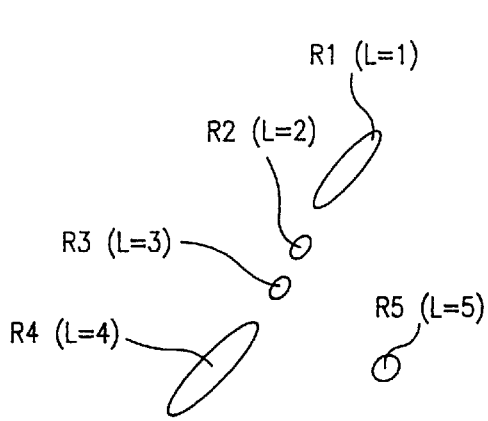
FIGS. 9A, 9B, 9C, 9D, 9E, and 9F are illustrations of assistance in explaining the renumbering process according to the present invention.
Figure 9B:
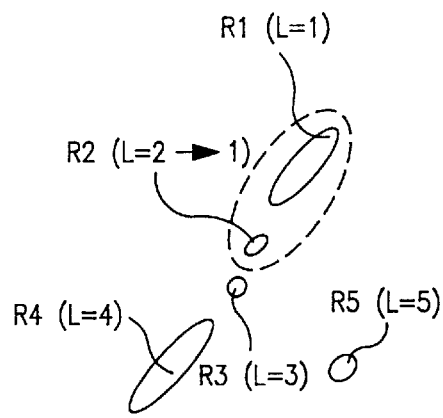

Herebelow, the clustering operation is schematically explained with reference to FIGS. 9A, 9B, 9C, 9D, 9E, and 9F. As a result of the labeling operation, each of linked regions R1, R2, R3, R4, and R5 in the binary image of the inspected surface of FIG. 7B are assigned the label numbers of 1, 2, 3, 4, and 5, respectively, as shown in FIG. 9A.

At first, the first region R1 and the second region R2 are set as the target region (L=1) and the counterpart region (M=L=2), respectively. Since the most frequent oriented directions (D(FLmax) and D(FMmax)) of the regions R1 and R2 are within a predetermined allowable range or the same (step S50), because these regions R1 and R2 are located on substantially the same line. Therefore, regions R1 and R2 can be clustered (step S50), as enclosed by a dot line in FIG. 9B, and the information representing that the label number of regions R2 is renumbered to 1 from 2 is stored (step S52).

Figure 9C:
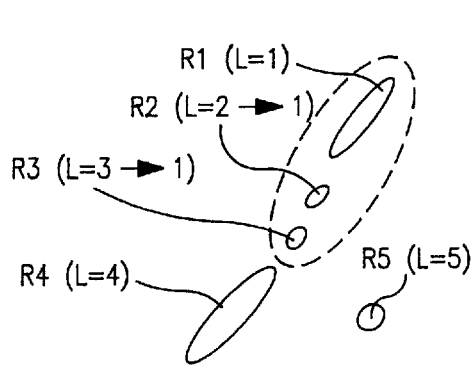

Next the third region R3 is set as the counterpart region (M=3) of the target region (L=1) which is combined regions R1 and R2, as enclosed by a dot line in FIG. 9C. Similarly, since the third region R3 can be clustered to the combined target regions R1 and R2, the information that the label number of the region R3 is renumbered to 1 from 3 is stored.

Figure 9D:
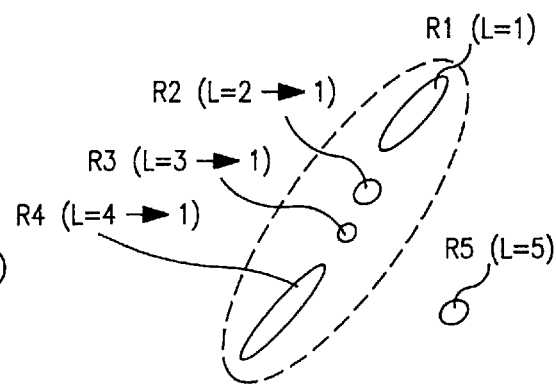

Similarly, the fourth region R4 can be clustered to the combined target regions R1, R2, and R3, with the label number thereof is renumbered to 1, as shown in FIG. 9D.

Figure 9E:
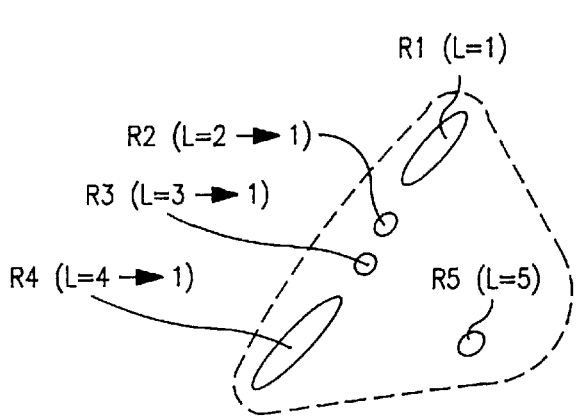
Figure 9F:
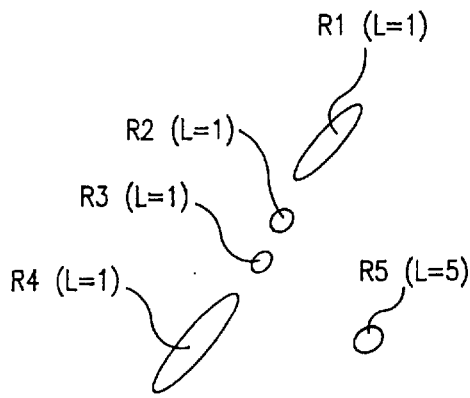

Next the fifth region R5 is set as the counterpart region (M=5) of the combined target regions R1, R2, R3, and R4 (L=1). The fifth region R5 is not on the same line and is deviated from the combined target regions R1, R2, R3, and R4, as shown in FIG. 9E. Therefore, this counterpart region R5 can not be clustered, as shown in FIG. 9F. In other words, the regions R1, R2, R3, and R4 can be combined or clustered in a single region having the same label number L which is one.

After these clustering and renumbering processes are completed, it is determined for each joined data area of plural labelled areas determined to be similarly oriented whether the joined data area represents a flaw based on the area (size) of the joined data area.

As a result, flaws due to a single cause but comprising a series of small, individually minute flaws can be accurately detected because the image data representing these individually minute flaws can be combined and distinguished from dust or other foreign surface matter.

When evaluating by means of the flaw detection method using image processing according to the prior art whether an image of an inspected item represents a flaw caused by physical impact, the evaluation is based on the size of the image alone, and it is therefore difficult to distinguish between small images caused by dust or other foreign matter on the surface and images caused by small flaws. With the method of the present invention, however, the long axis orientation of images can be recognized using a contour vector, plural small images oriented in the same direction can be extracted from among plural separate images, and the data from these similarly oriented images can be combined for accurate flaw evaluation. As a result, small, disjointed flaws can be more reliably evaluated as flaws by the method of the invention than is possible with the prior art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Figure 6:
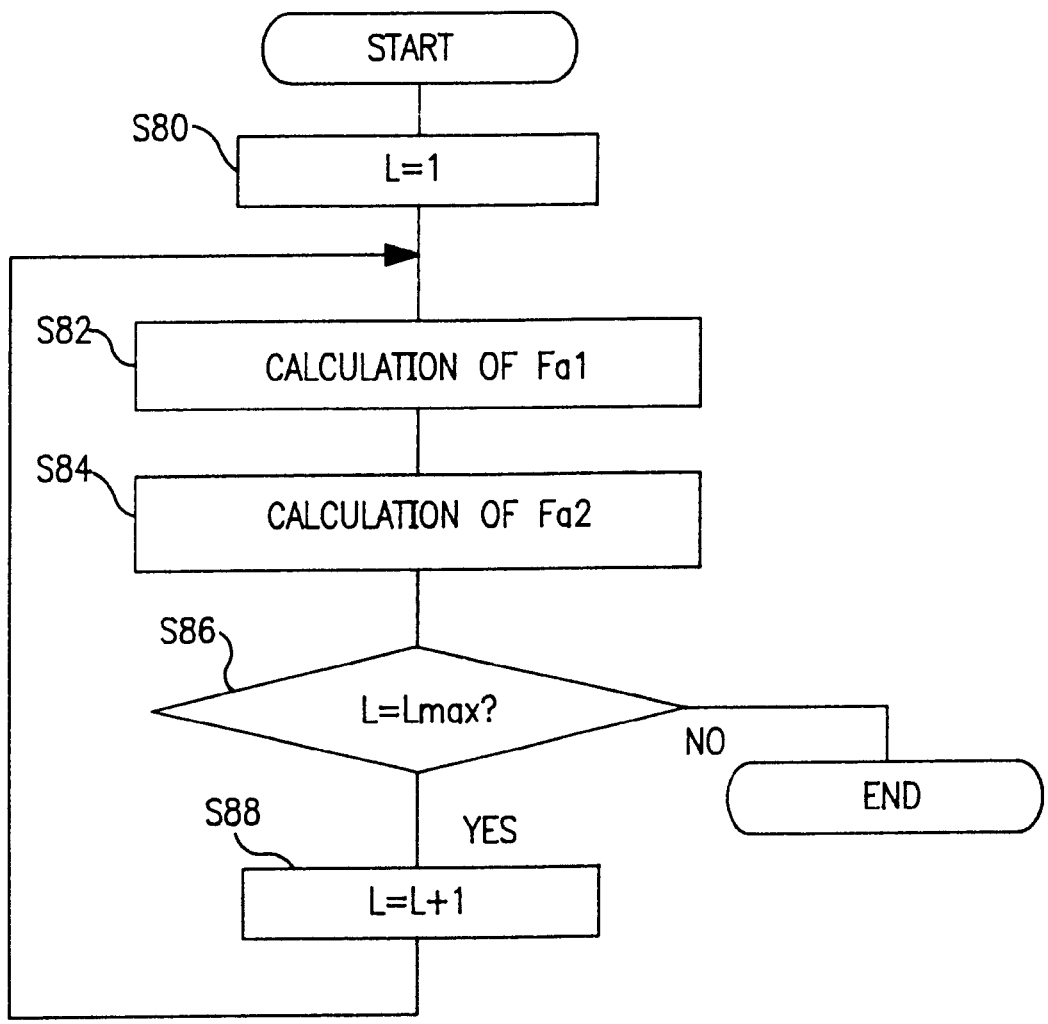
FIG. 6 is a flow chart showing an operation of the flaw coefficients calculation block in FIG. 2.

Referring to FIG. 6, the operation of sub block #9 "FLAW COEFFICIENTS CALCULATION" in FIG. 2 is shown.

At step S80, the label number L is set to one. The first clustered regions are examined.

Figure 10:
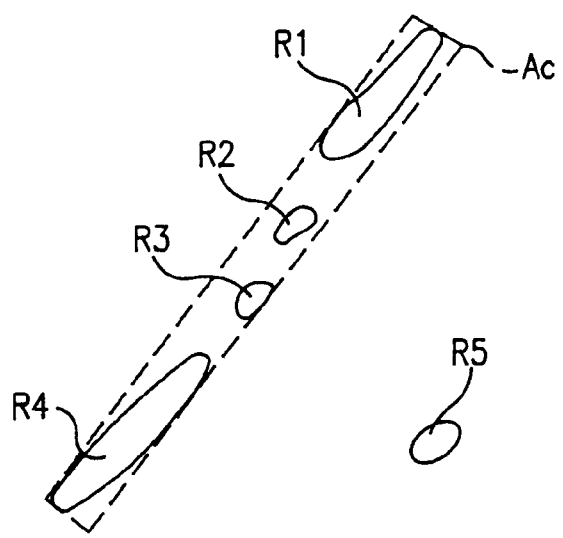
FIG. 10 is an illustration of assistance in explaining the obtaining the first and second flow coefficients.

At next step S82, an area of the first clustered regions with the common label number (L=1) is calculated to obtain a first flaw coefficient Fa1. Please note that thus calculated area (Fa1) corresponds to the summed area of regions R1, R2, R3, and R4 contained by a dot line in FIG. 10.

At next step S84, a rectangle circumscribing area of the first clustered regions (L=1) is calculated to obtain a second flaw coefficient Fa2. Thus, the first and second flaw coefficients Fa1 and Fa2 are obtained with respect to the first clustered regions. Please note that thus calculated area (Fa2) corresponds to the rectangular area indicated by a dot line in FIG. 10.

At next step S86, it is judged whether the label number L is the greatest among the clustered regions or not. If "No", the procedure advances to next step S88.

At step S88, the label number L is incremented by one and the procedure returns to step S82. This time, the flaw coefficients Fa1 and Fa2 are subsequently obtained with respect to the next, or second, clustered regions until it is judged "YES" at step S86.

However, when the flaw coefficients Fa1 and Fa2 are obtained with respect to all clustered regions at this sub routine #9, it is judged as "YES" at step S86, the procedure ends.

Then, the image processor 9 outputs the flaw coefficient signal Sf including thus obtained first and second flaw coefficients Fa1 and Fa2 to the outside through the output port 19. These flaw coefficients Fa1 and Fa2 are compared with the reference flaw coefficients having predetermined value for judging whether thus obtained image is indicative of a flaw on the object or not. It is to be noted that the reference flaw coefficients can be determined according to the quality required for each object (product), because the allowable limit of flaw is different according to the usage of the product. Therefore, the reference flow coefficients are set inside the flaw detection apparatus previously or supplied from the externals of the apparatus.

It is possible to determine the reference flaw coefficients with respect to the flaw sample by using the flaw detection apparatus according to the present invention in a manner which will be described later with reference to FIGS. 12, 13, and 14.

Figure 12:
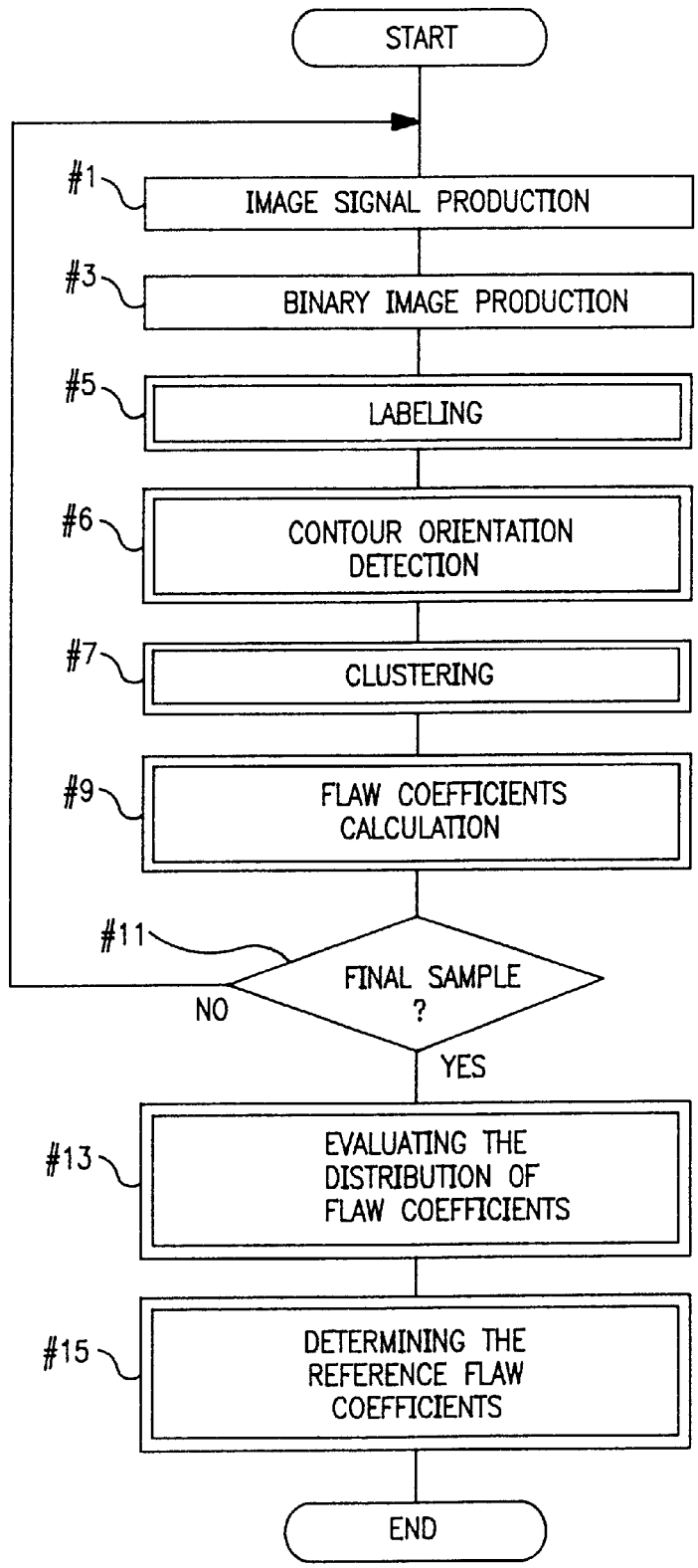
FIG. 12 is a flow chart showing the operation for judging flaw according to the present invention.
Figure 13:
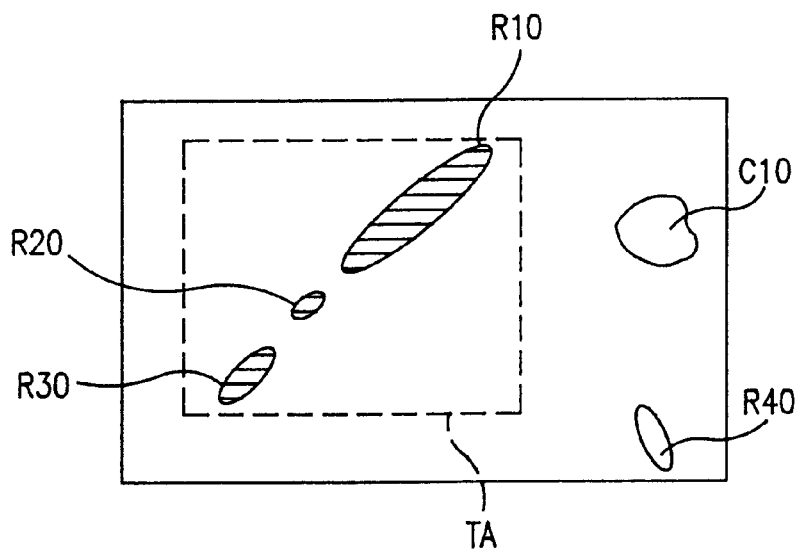
FIG. 13 is an illustration of assistance in explaining the operation of determining flaw coefficients block in FIG. 12.

Referring to FIG. 12, the flow chart describing the flaw judging operation according to the present invention is shown. The operations of the blocks #1, #3, #5, #6, #7, and #9 are identical to the blocks having the same block numbers shown in FIG. 2, and the description of those operation are omitted for the sake of brevity.

First, product samples bearing the flaws whose sizes are within an allowable range for use in the market and samples over an allowable range are prepared. In FIG. 13, for example, a sample bearing four flaws R10, R20, R30, and R40 and contaminant C10 is shown. Flaws R10, R20, and R30 are aligned on substantially a line, and the flaw R40 separates from the other flaws. The contaminant C10 is located on the surface thereof. In this case, the flaws R10, R20, and R30 enclosed by a rectangular area TA indicated by a dot line are regarded as the "target flaws" which may be caused by a single impact, but the flaw R40 may be caused by other factor. Therefore, the flaws R10, R20, and R30 is regarded as the "target flaw" to be detected, but the flaw R40 is disregarded.

In the operation of sub block #1, the video camera 3 is set to take the image of the rectangular area TA (Step #1). Each of thus prepared samples is examined its surface by the flaw detection apparatus according to the present invention through the operation of steps #1, #3, #5, #6, #7, #9, and #11 of FIG. 12. As a result, the flaw coefficients Fa1 and Fa2 for each samples with respect the target area TA wherein no contaminant or flaw which may be caused by a factor other than a signal impact is included.

Figure 14:
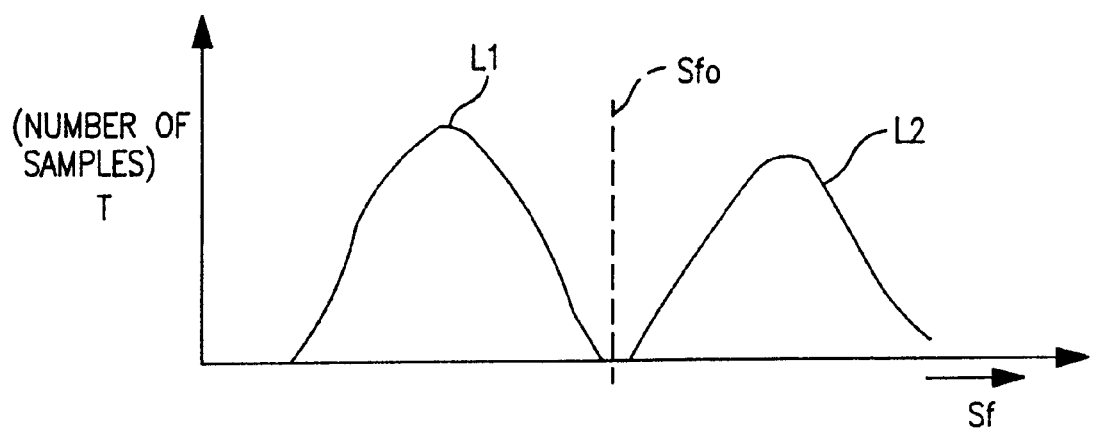
FIG. 14 is a graph showing the distribution of samples with respect to the flaw coefficients.

In sub block #13, "EVALUATING THE DISTRIBUTION OF FLAW COEFFICIENTS", the distribution of thus obtained flaw coefficients is obtained, as shown in FIG. 14. In FIG. 14, a line L1 shows a set (distribution) of flaw coefficients with respect to the samples bearing the flaws within the allowable flaw size range, and a line L2 shows those with respect to the samples bearing the flaws over the allowable flaw size range. It is to be noted that each of sets of the flaw coefficients within the allowable range and over the allowable range can be separated by a predetermined value of flaw coefficient Sfo in two group, as shown in FIG. 14.

In next sub block #15, "DETERMINING THE REFERENCE FLAW COEFFICIENTS", the value Sfo obtained in sub block #13 is determined as a reference flaw coefficient for the flaw judgment.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is;:

1. A flaw detection apparatus for detecting a flaw formed on an object's surface, based on first digital image data indicative of said object's surface, as a first group of disconnected images adjacent to each other and having substantially the same directional orientation, said apparatus comprising:

a first direction detection means for detecting a direction in which said first group extends based on a contour thereof;

a first cluster means for combining a plurality of images of said first group that are disconnected and extend in the same direction;

a first flaw signal producing means which calculates an area of said combined first group and produces, when the area of said combined first group exceeds a predetermined value, a first flaw signal indicating that said combined first group represents a flaw;

said first flaw signal producing means includes:
      a first flaw coefficient determining means for calculating an area of said combined first group to determine a first flaw coefficient; and
      a second flaw coefficient determining means for calculating an area of rectangular region circumscribing said combined first group to determine a second flaw coefficient.

2. A flaw detection apparatus as claimed in claim 1, wherein said first direction detection means comprises:

a contour detection means for detecting a contour line of said first group;

a contour direction detection means for detecting a contour direction in which said detected contour line extends most;

an extending direction determination means for determining said first direction based on said detected contour direction.

3. A flaw detection apparatus as claimed in claim 2, wherein said contour detection means comprises:

a contour pixel detection means for detecting contour pixels defining a contour line of each said first group; and a contour vector detecting means for detecting a contour vector connecting each neighboring two contour pixels.

4. A flaw detection apparatus as claimed in claim 3, wherein said contour direction detection means comprises:

a frequency detection means for detecting the frequency of said contour vector extending in each direction; and a contour direction determination means for determining the most frequent direction of said contour vector as said first direction.

5. A flaw detection apparatus as claimed in claim 1, wherein said first cluster means combines a plurality of said first groups extending in the directions different from each other less than a predetermined degree.

6. A flaw detection apparatus as claimed in claim 1, further comprising a reference flaw signal means for providing a reference flaw signal indicative of a flaw range of said first and second flaw coefficients for the detection of the flaw.

7. A flaw detection apparatus as claimed in claim 6, wherein said reference flaw signal means comprises:

a digital image signal producing means for producing a second digital image signal indicative a surface of a sample object bearing a flaw formed in allowable limit size and shape therein as a second group of plural pixels;

a second direction detection means for detecting a direction in which each said second group extends;

a second cluster means for combining a plurality of said second group extending in the same direction;

a third flaw coefficient determining means for calculating an area of said combined second group to determine a third flaw coefficient;

a fourth flaw coefficient determining means for calculating an area of rectangular region circumscribing said combined fourth group to determine a fourth flaw coefficient; and an evaluation means for evaluating the distribution of said third and fourth flaw coefficients to determine said flaw range.

* * * * *